United States Patent [19]

Scott et al.

[11] Patent Number: 4,649,087
[45] Date of Patent: Mar. 10, 1987

[54] CORROSION RESISTANT ALUMINUM BRAZING SHEET

[75] Inventors: Darwin H. Scott, Mechanicsville; Kenneth D. Wade, Richmond, both of Va.

[73] Assignee: Reynolds Metals Company, Richmond, Va.

[21] Appl. No.: 742,892

[22] Filed: Jun. 10, 1985

[51] Int. Cl.$^4$ ............................................. B32B 15/20
[52] U.S. Cl. .................... 428/654; 420/529; 420/533; 420/535; 420/537
[58] Field of Search ............... 420/529, 533, 534, 535, 420/537, 538; 148/438, 439; 428/654

[56] References Cited

U.S. PATENT DOCUMENTS

| | | | |
|---|---|---|---|
| 1,869,996 | 8/1932 | Bossert | 420/529 |
| 3,496,620 | 2/1970 | Wolfe, Jr. | 29/183.5 |
| 3,878,871 | 4/1975 | Anthony et al. | 138/140 |
| 3,898,053 | 8/1975 | Singleton, Jr. | 29/197.5 |
| 3,923,557 | 8/1975 | Anthony et al. | 148/32 |
| 3,938,991 | 2/1976 | Sperry et al. | 75/143 |
| 4,005,243 | 1/1977 | Baba et al. | 428/469 |
| 4,039,298 | 8/1977 | Anthony et al. | 428/558 |
| 4,072,542 | 2/1978 | Murakado et al. | 148/11.5 |
| 4,093,782 | 6/1978 | Anthony et al. | 428/654 |
| 4,140,556 | 2/1979 | Baba et al. | 148/32.5 |
| 4,146,163 | 3/1979 | Anderson et al. | 228/158 |
| 4,146,164 | 3/1979 | Anderson et al. | 228/158 |
| 4,211,827 | 7/1980 | Pryor et al. | 428/654 |
| 4,214,925 | 7/1980 | Arita et al. | 148/127 |
| 4,235,628 | 11/1980 | Althoff et al. | 75/148 |
| 4,244,756 | 1/1981 | Tanabe et al. | 148/32 |
| 4,284,437 | 8/1981 | Baba et al. | 148/11.5 |
| 4,339,510 | 7/1982 | Kaify et al. | 428/654 |

FOREIGN PATENT DOCUMENTS

| | | |
|---|---|---|
| 70226608 | 10/1972 | Japan. |
| 8313614 | 3/1974 | Japan. |
| 8312695 | 3/1974 | Japan. |
| 80419774 | 9/1978 | Japan. |
| 80621140 | 11/1978 | Japan. |
| 8323560 | 1/1979 | Japan. |
| 8327335 | 2/1979 | Japan. |
| 8351197 | 4/1979 | Japan. |
| 8172158 | 11/1979 | Japan. |
| 55-142846 | 4/1980 | Japan. |
| 57-224156 | 6/1982 | Japan. |
| 58-129747 | 1/1983 | Japan. |

OTHER PUBLICATIONS

"New Corrosion Resistant Aluminum Alloys for Brazing Heat Exchangers",—Kobe Steel Ltd.
"New Aluminum Alloy 3009—High Strength Without Magnesium"—Light Metal Age, Jun., 1979, pp. 22 and 23.

*Primary Examiner*—R. Dean
*Attorney, Agent, or Firm*—Alan M. Biddison

[57] ABSTRACT

An aluminum core alloy for use in the manufacture of brazed heat exchanger assemblies having high resistance to corrosion and moderate strength. A preferred composition of the aluminum base alloy consists of from 0.13 to 0.22% titanium, from 0.8 to 1.5% manganese, 0.4 to 0.6% copper, up to 0.7% iron, up to 0.3% silicon, up to 0.3% magnesium, with the balance being essentially aluminum and normal impurities. Another preferred composition, which is a modification of the preceding composition, includes 0.3 to 0.6% magnesium.

17 Claims, No Drawings

CORROSION RESISTANT ALUMINUM BRAZING SHEET

BACKGROUND OF THE INVENTION

The present invention relates to an improved composite aluminum brazing product or sheet and an aluminum brazing material useful as a core alloy in such product. More particularly, the invention provides an AA 3000 series type alloy having improved corrosion resistance because of the intentional addition of increased amounts of titanium.

The use of clad composite aluminum brazing sheet to join aluminum alloy components is well known. In vacuum brazing the parts to be joined are assembled and heated in a vacuum to an elevated temperature, such as about 1100° F. At that temperature a cladding alloy on one of the parts melts and fuses the parts to each other.

Brazing sheet with core alloys AA3003 ("AA" is the Aluminum Association, Inc., designation for wrought aluminum alloys) or AA3005 clad on at least one side with an Al-Si brazing alloy are commonly used in the manufacture of automobile heat exchangers. While AA3003 and AA3005 in numerous applications are generally considered to be corrosion resistant by themselves, it has been observed that when they are used as the core alloy in a brazed heat exchanger, the extreme heat from brazing and the proximity of silicon in the filler alloy cladding seriously degrade their corrosion resistance.

AA3005 (an Al-Mn-Mg alloy) has considerably higher strength than AA3003 (an Al-Mn alloy) as a result of its magnesium content, but the brazeability and corrosion performance are partially sacrificed in favor of higher strength. Other means of increasing strength without this compromise have not been found heretofore. Brazed aluminum heat exchangers are frequently subject to failure as a result of corrosion attack from the exterior. Since the total thickness of brazing sheet composite materials is typically comprised of up to 95% core alloy, it can be appreciated that the life expectancy of the brazed aluminum heat exchanger is largely dependent upon the corrosion resistance of the core alloy.

Brazeability is required for the manufacture of heat exchangers in an efficient and economical manner. Corrosion resistance is necessary for heat exchangers because some environments in which they are used are highly corrosive. High strength is desired for reducing the material requirements of the heat exchanger, for enduring the stresses during manufacturing, and for containing the operating pressures in the completed heat exchanger.

There is a need, therefore, for an aluminum alloy for use as a core alloy in aluminum brazing sheet with high strength, improved resistance to corrosion attack and excellent brazeability.

SUMMARY OF THE INVENTION

Accordingly, it is an object of the present invention to provide a corrosion resistant aluminum brazing material useful as a core alloy in an aluminum brazing product, such as vacuum brazing sheet. Such sheet conventionally has a core alloy clad on at least one face with a brazing alloy.

To achieve the foregoing and other objectives, the present invention is directed to an aluminum alloy which can be used as the core of vacuum brazing sheet and the like and exhibits improved resistance to penetration by corrosion. The improved qualities of the alloy of the present invention surprisingly and unexpectedly result from the addition of increased amounts of titanium to compositions similar to AA3003 and AA3005. The added quantity of titanium does not seriously degrade the formability of the alloy.

The alloy of the present invention provides an aluminum base core alloy for use in composite brazing sheet that contains 0.11 to 0.30% titanium (all percentages are weight percentages), 0.3 to 1.5% manganese, 0.005 to 0.7% copper, up to 0.7% iron, up to 0.8% silicon, up to 1.5% magnesium, with the balance being essentially aluminum and normal impurities. A first preferred composition has 0.13 to 0.22% titanium, 0.8 to 1.5% manganese, 0.4 to 0.6% copper, up to 0.7% iron, up to 0.3% silicon, and up to 0.3% magnesium, with the balance essentially aluminum and normal impurities. A second preferred composition has the same composition as the first preferred composition, except that the level of magnesium is between 0.3 and 0.6%.

In another preferred composition, which is a modification of either the first or the second preferred compositions, the amount of titanium included in the alloy is limited to that amount which will not form an excessive amount of coarse intermetallic compounds. Since formation of intermetallic compounds is influenced by casting practices, the amount of titanium that can be added without formation of coarse intermetallic compounds is a variable. In one case, it was found that there was negligible formation of intermetallics with the addition of 0.17% Ti and noticeable formation of intermetallics with the addition of 0.22% Ti. Since corrosion resistance increases with increases in the amount of Ti, a preferred range for Ti would be between about 0.15 and 0.18%.

To be useful for brazing, the inventive alloy is produced in the form of a sheet which is clad with a thin layer of metal on one side or on both sides. The metal layer or cladding is a brazing alloy, an example of which is an aluminum base alloy containing 5 to 14% Si, with or without additional alloying elements. If the inventive core alloy is clad with the brazing alloy on only one side, the other side might or might not be clad with some other type of alloy different from the core alloy. In one embodiment of the invention, a braze cladding is applied to one face or surface of the core alloy and a galvanically protective cladding is applied to the other face. Examples of protective cladding include AA7072 and high purity aluminum.

DETAILED DESCRIPTION OF THE PREFERRED EMBODIMENTS

The core alloy provided by the present invention contains from 0.11 to 0.30% titanium, from 0.3 to 1.5% manganese, from 0.005 to 0.7% copper, up to 0.7% iron, up to 0.8% silicon, up to 1.5% magnesium, and balance essentially aluminum. One of the preferred compositions has from 0.13 to 0.22% titanium, from 0.8 to 1.5% manganese, from 0.4 to 0.6% copper, up to 0.7% iron, up to 0.3% silicon, up to 0.3% magnesium and balance essentially aluminum. In another preferred composition, which is a modification of the preceding, the amount of magnesium is between about 0.3 and 0.6%. In a modification of either of the preceding, the amount of titanium is between about 0.15 and 0.18%.

The composition limits for the inventive alloy were established as follows:

Manganese is included primarily to increase strength. This is a common alloy addition in the AA3000 series alloys, in which it forms a dispersion of intermetallic compound with aluminum.

Magnesium is an optional component of the alloy. When included, it provides added strength. Common AA3000 series alloys contain up to 1.3%, but most brazing sheet core alloys have 0.6% or less. When added with sufficient silicon or copper, the alloy may be age hardened. A small amount can be included for vacuum brazing sheet when the filler alloy cladding has very low magnesium content. The level of Mg added must be controlled, however, as large amounts may adversely affect the corrosion resistance of the core alloy in a brazed structure. Large amounts of Mg also lower the melting point and limit the usefulness of the alloy for brazing. If a flux is used in the brazing process, the magnesium content of the alloy must be kept low.

Silicon is present either as an impurity or as an intentional addition. In the present alloy, silicon improves the strength of the alloy, when magnesium is present, as is common in AA6000 series alloys, or when manganese is present, as is found in AA3009, or when both manganese and magnesium are present. Excessive amounts of Si, however, should be avoided because Si tends to lower the melting point of the alloy to a temperature not suitable for brazing or the intended environment of the brazed article.

Copper as an alloying component has the effect of increasing strength. It also may be present as an impurity. Although Cu additions are frequently considered to impair the corrosion resistance of aluminum alloys, the Cu additions made to the inventive alloys were not found to have a deleterious effect on corrosion resistance and may indeed improve corrosion resistance when Mg is present. Large amounts of Cu also lower the melting point and limit the usefulness of the alloy for brazing.

Iron is present as an impurity or as an intentional addition. As an intentional addition, it improves strength.

Titanium is a crucial intentional addition to the inventive alloys. When added at the levels indicated, it dramatically improves the corrosion resistance of the alloy by a mechanism that is not understood. It was noted that there appeared to be a change in the mode of corrosion attack as the amount of titanium increased. Corrosion attack changed from hemispherical pitting to a lateral exfoliation type attack.

The improvement in corrosion resistance is directly related to the amount of titanium added, such that an alloy with 0.10 titanium has better corrosion resistance than an alloy with 0.01 or 0.08 titanium. An alloy with 0.22% titanium has better corrosion resistance than an alloy with 0.10 or 0.13 % titanium. The alloy with 0.22 titanium, however, has intermetallic compounds or primary constituents that might have an adverse effect on ductility and formability. We would expect that an alloy with 0.30 titanium would be extremely corrosion resistant. The effect of such a high level of titanium on ductility and formability is not known. In some applications, the improved corrosion resistance might warrant the loss of some ductility and formability.

Titanium is normally added to aluminum alloys in order to produce a cast structure with a fine grain size. In the alloys of the present invention, the increases in corrosion resistance obtained by increased levels of titanium additions could not be related to changes in grain size. Typically, the change in grain size of Al-Mn alloys as a result of Ti additions is more a result of the method and timing of the addition than the total amount added.

The consequences of adding titanium in an amount in excess of 0.10%, according to published materials, include a loss in formability (see U.S. Pat. No. 4,339,510). In the alloys of the present invention, any reduction in usefulness due to any slight reduction of formability are more than offset by the benefit of the dramatic improvement in corrosion resistance.

When the amount of Ti added to an AA 3000 series type alloy reached 0.22% in the present invention, some of the Ti combined with Al to form excessively large crystals of intermetallic compound within the alloy. Such crystals are generally considered to be undesirable according to conventional metallurgical practice. No appreciable number of crystals was noted with the addition of 0.17% Ti. It is expected that a range of Ti between 0.15 and 0.18% would provide the most corrosion resistance without significantly decreasing formability. Formability also will be influenced by alloy casting and fabrication practices. There is a balance between improved corrosion resistance and the other consequences of adding large amounts of Ti that must be considered for each potential application.

The following examples are presented by way of example only and are for the purposes of illustration. They are not to be construed as limiting the scope of the invention in any manner.

EXAMPLE I

The compositions listed in Table 1 were laboratory cast as 3"×8" or 4"×14" DC ingots, homogenized above 1000° F., hot rolled, clad 10% one side with a brazing filler alloy, hot rolled at temperatures between 1000° and 400° F., and cold rolled to 0.015" thick sheet with an intermediate anneal of 750° F. at 0.027" gauge. The resulting sheet was vacuum brazed by heating in a vacuum chamber to 1100° F.

TABLE 1

| Compositions of Alloys in wt %, Balance Aluminum | | | | | |
|---|---|---|---|---|---|
| A | .2 Si .6 Fe 1.1 Mn | .16 Cu | <.01 Ti | <.01 Mg | (AA3003) |
| B | .2 Si .6 Fe 1.1 Mn | .17 Cu | <.01 Ti | .5 Mg | (AA3005) |
| C | .2 Si .6 Fe 1.0 Mn | .44 Cu | <.01 Ti | <.01 Mg | |
| D | .2 Si .6 Fe 1.0 Mn | .43 Cu | .08 Ti | <.01 Mg | |
| E | .2 Si .6 Fe 1.0 Mn | .44 Cu | .10 Ti | <.01 Mg | |
| F | .2 Si .6 Fe 1.0 Mn | .44 Cu | .13 Ti | <.01 Mg | |
| G | .2 Si .6 Fe 1.0 Mn | .44 Cu | .22 Ti | <.01 Mg | |
| H | .2 Si .6 Fe 1.0 Mn | .55 Cu | .16 Ti | .5 Mg | |
| I | .3 Si .6 Fe 1.0 Mn | <.01 Cu | .16 Ti | .4 Mg | |
| J | .2 Si .6 Fe 1.0 Mn | .49 Cu | .13 Ti | <.01 Mg | |
| K | .2 Si .6 Fe 1.4 Mn | .47 Cu | .13 Ti | <.01 Mg | |
| L | .2 Si .6 Fe 1.3 Mn | .04 Cu | .13 Ti | <.01 Mg | |
| M | .8 Si .6 Fe 1.3 Mn | .37 Cu | .13 Ti | .4 Mg | |

Cladding alloy contained nominally 12% Si, 1% Mg, 0.4% Bi, and incidental impurities in an aluminum base.

To evaluate the post-brazed corrosion resistance of the core alloys, specimens of the brazing sheet materials prepared as described above were exposed to the cyclical accelerated corrosion test described in ASTM G43. The corrosion test specimens were prepared by shearing 3"×3" coupons and masking the core alloy side. The specimens were then exposed, brazing cladding alloy side up, in a test cabinet at an angle of 60 degrees from the horizontal. After a selected number of days in the corrosive environment, some of the test specimens were removed from the cabinet, cleaned in a chromicphosphoric acid solution at 180° F. for 20 minutes, soaked in concentrated nitric acid for 3 minutes and rinsed in distilled water. Subsequently, the specimens were pressure tested in a special gasketted jig at 30 psig under water to observe and count the number of perforations, as revealed by bubbles. The test results are summarized in Table 2. The test for a particular alloy was terminated when corrosion had proceeded to a point that its specimen had innumerable perforations, or after a pre-selected time period had elapsed.

TABLE 2

Number of perforations observed after various times in the corrosion test
(days in the test environment)

| Alloy | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|
| A | >10 | 6 | >10 | >10 | | | | | | | | | | | | | | |
| B | >10 | 6 | >10 | >10 | | | | | | | | | | | | | | |
| C | — | 0 | 7 | >10 | >10 | | | | | | | | | | | | | |
| D | — | 0 | 2 | 0 | 9 | 3 | >10 | >10 | | | | | | | | | | |
| E | — | 0 | 0 | 0 | 0 | 0 | 5 | 1 | 6 | 4 | 0 | >10 | | | | | | |
| F | — | 0 | 0 | 0 | 0 | 0 | 0 | 0 | 0 | 0 | 0 | 0 | 0 | — | 0 | 0 | — | 0 |
| G | — | 0 | 0 | 0 | 0 | 0 | 0 | 0 | 0 | 0 | 0 | 0 | 0 | — | 2 | 2 | — | 0 |
| H | — | — | 0 | 0 | 0 | — | — | 3 | 0 | 2 | >10 | | | | | | | |
| I | — | — | 0 | 1 | >10 | >10 | | | | | | | | | | | | |
| J | 0 | 0 | 0 | 0 | 0 | 0 | 0 | 0 | 0 | 0 | 0 | 0 | 0 | (test stopped) | | | | |
| K | 0 | 0 | 0 | 0 | 0 | 0 | 0 | >10 | >10 | | | | | | | | | |
| L | 0 | 0 | 0 | 0 | 0 | 0 | 0 | 0 | 1 | 0 | 0 | (test stopped) | | | | | | |
| M | 0 | 0 | 0 | 0 | 0 | 0 | 0 | 0 | 0 | 1 | 0 | (test stopped) | | | | | | |

It can be observed in Table 2 that the brazing sheet specimens with the 3003 (Alloy A) and the 3005 (Alloy B) core alloys were relatively very susceptible to perforation by corrosion attack. The principal differences between these alloys and Alloys D through L is that Alloys A and B contain very low levels of Ti.

The effect of the Ti level in the subject aluminum alloys on corrosion resistance is obtained by comparing the corrosion test results for the brazing sheet with core Alloys C through G. The data in Table 2 indicates that increasing the Ti level from <0.01 to 0.22% resulted in progressive improvements in the resistance of the brazing sheet materials to penetration by corrosion.

Comparison of the data for Alloys B, H and I reveals the improvement in corrosion resistance obtained by the addition of Ti to the subject alloys containing Mg, which is commonly added to Al-Mn base alloys for the purpose of increasing strength, as demonstrated by the data in Table 3. As shown in Table 2, the brazing sheet specimens made with Alloys H and I were significantly less susceptible to penetration by corrosion attack than was the brazing sheet specimens made with Alloy B, which was essentially free of Ti. The fact that the brazing sheet with Alloy H exhibited a higher resistance to corrosion attack than the brazing sheet with Alloy I is considered to be attributable to the addition of Cu, which makes Cu a necessary addition when increased amounts of Mg are present.

The tensile properties of the subject alloys were evaluated by means of a standard tensile test, using strips of the brazing sheet which had been brazed at 1100° F. The specimens were tested with the load applied parallel to the rolling direction. The results of the tests are given in Table 3.

TABLE 3

Tensile Properties of the Subject Alloys After Brazing

| Alloy | Ultimate Tensile Strength | .2% offset Yield Strength | % elongation in 2" |
|---|---|---|---|
| A | 17.8 ksi | 6.8 ksi | 19.5 |
| B | 23.2 | 8.7 | 17.0 |
| C | 18.9 | 7.7 | 15.3 |
| D | 19.3 | 7.1 | 17.8 |
| E | 20.1 | 7.7 | 16.3 |
| F | 20.1 | 7.1 | 19.3 |
| G | 20.4 | 7.5 | 17.0 |
| H | 25.5 | 9.5 | 16.6 |
| I | 20.0 | 8.1 | 17.3 |
| J | 20.9 | 6.9 | 17.5 |
| K | 22.1 | 7.7 | 17.7 |
| L | 19.0 | 7.4 | 13.3 |
| M | 24.9 | 8.6 | 16.3 |

Cu was added primarily for the purpose of increasing strength, as is commonly known, and as demonstrated by the data in Table 3, but the Cu addition also had a small influence on the corrosion resistance of the subject alloys. In comparing the test results for Alloys A and C, neither of which contain appreciable amounts of Ti, it is observed that the increased Cu level in Alloy C had no deleterious effect on the corrosion resistance and, in fact, appeared to result in a modest improvement. On the other hand, comparison of Alloys K and L suggests that when Mn is at the upper level of 1.3%, an addition of 0.5% Cu may be slightly deleterious to corrosion resistance, although not to the extent that it offsets the benefit of the Ti addition.

The data for Alloy M indicates that exceptionally good corrosion resistance is also obtained in an alloy containing relatively high levels of Si, Cu, Mn, and Mg, to which a 0.13% Ti addition is made. Of the tested alloys, this composition had a very high strength, as shown in Table 3.

Previously, specific examples of the present invention have been described. It should be appreciated, however, that these examples have been described for the purposes of illustration only, without any intention of limiting the scope of the present invention. Rather, it is the intention that the present invention be limited only by the appended claims.

What is claimed is:

1. An aluminum brazing material useful as a core alloy in a brazing product having a core alloy clad with a brazing alloy, said brazing material, by weight percent, consisting essentially of 0.11 to 0.30% titanium, 0.3 to 1.5% manganese, 0.4 to 0.6% copper, up to 0.7% iron, up to 0.8% silicon, up to 1.5% magnesium, with the balance being aluminum and normal impurities.

2. The aluminum brazing material of claim 1, wherein the magnesium content is up to 0.3%.

3. The aluminum brazing material of claim 1, wherein the magnesium content is between 0.3 and 0.6%.

4. The aluminum brazing material of claim 1, wherein the titanium content is between 0.13 and 0.22%.

5. The aluminum brazing material of claim 1, wherein the titanium content is between 0.15 and 0.18%.

6. The aluminum brazing material of claim 4, wherein the manganese content is between 0.8 and 1.5%, the silicon content is up to 0.3%, and the magnesium content is up to 0.3%.

7. The aluminum brazing material of claim 4, wherein the manganese content is between 0.8 and 1.5%, the silicon content is up to 0.3%, and the magnesium content is between 0.3 and 0.6%.

8. An aluminum brazing sheet having a core alloy and a brazing alloy clad on at least one face of the core alloy, the improvement wherein said core alloy, by weight percent, consists essentially of 0.11 to 0.30% titanium, 0.3 to 1.5% manganese, 0.4 to 0.6% copper, up to 0.7% iron, up to 0.8% silicon, up to 1.5% magnesium, with the balance being aluminum and normal impurities.

9. The improvement of claim 8, wherein said core alloy includes up to 0.3% magnesium.

10. The improvement of claim 8, wherein said core alloy includes between 0.3 and 0.6% magnesium.

11. The improvement of claim 8, wherein said core alloy includes between 0.13 and 0.22% titanium.

12. The improvement of claim 8, wherein said core alloy includes between 0.15 and 0.18% titanium.

13. The improvement of claim 8, wherein said core alloy includes up to 0.3% magnesium, between 0.8 and 1.5% manganese, up to 0.3% silicon, and between 0.13 and 0.22% titanium.

14. The improvement of claim 13, wherein said core alloy includes between 0.15 and 0.18% titanium.

15. The improvement of claim 8, wherein core alloy includes between 0.3% and 0.6% magnesium, between 0.8 and 1.5% manganese, up to 0.3% silicon, and between 0.13 and 0.22% titanium.

16. The improvement of claim 15, wherein said core alloy includes between 0.15 and 0.18% titanium.

17. An aluminum brazing material useful as a core alloy in a brazing product having a core alloy clad with a brazing alloy, said brazing material, by weight percent, consisting essentially of 0.11 to 0.30% titanium, 0.3 to 1.5% manganese, 0.005 to 0.7% copper, up to 0.7% iron, up to 0.8% silicon, less than 0.01% magnesium, with the balance being aluminum and normal impurities.

* * * * *